US010754156B2

(12) United States Patent
Harrison et al.

(10) Patent No.: US 10,754,156 B2
(45) Date of Patent: Aug. 25, 2020

(54) MULTIPLE-EYE, SINGLE-DISPLAY, ULTRAWIDE-FIELD-OF-VIEW OPTICAL SEE-THROUGH AUGMENTED REALITY SYSTEM

(71) Applicant: Lockheed Martin Corporation, Bethesda, MD (US)

(72) Inventors: Gregory A. Harrison, Oviedo, FL (US); Patrick J. Goergen, Orlando, FL (US); Randel A. Crowe, Interlachen, FL (US); David A. Smith, Cary, NC (US); Rick Boggs, Orlando, FL (US); Cynthia M. Saelzer, Oviedo, FL (US); Michael A. Dembinski, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 417 days.

(21) Appl. No.: 14/887,800

(22) Filed: Oct. 20, 2015

(65) Prior Publication Data
US 2017/0108696 A1   Apr. 20, 2017

(51) Int. Cl.
*G02B 27/24* (2006.01)
*G02B 27/01* (2006.01)
(Continued)

(52) U.S. Cl.
CPC ..... *G02B 27/0172* (2013.01); *G02B 27/0176* (2013.01); *G02B 27/0179* (2013.01);
(Continued)

(58) Field of Classification Search
CPC ...... G02B 2027/013; G02B 2027/0134; G02B 2027/0136; G02B 2027/0159;
(Continued)

(56) References Cited

U.S. PATENT DOCUMENTS

| 3,880,509 A | 4/1975 | Herndon |
| 4,026,641 A | 5/1977 | Bosserman et al. |
| (Continued) | | |

FOREIGN PATENT DOCUMENTS

| CA | 2750287 A1 | 11/2011 |
| CA | 2750287 C  | 11/2011 |
| (Continued) | | |

OTHER PUBLICATIONS

First Office Action for Chinese Patent Application No. 201180067287.4, dated Feb. 4, 2015, 11 pages.
(Continued)

*Primary Examiner* — Stephone B Allen
*Assistant Examiner* — Jyotsna V Dabbi
(74) *Attorney, Agent, or Firm* — Withrow & Terranova, PLLC (57) ABSTRACT

An optical system that includes a lens element and a lens element holder. The optical system also includes a display device holder that is configured to hold a display device having a single light-emitting panel. The lens element includes a right-eye reflective surface and a left-eye reflective surface. The right-eye reflective surface includes a first plurality of different surface elements oriented to reflect and collimate light from corresponding different regions of a first portion of the light-emitting panel toward a predetermined right-eye location, and the left-eye reflective surface includes a second plurality of different surface elements oriented to reflect and collimate light from corresponding different regions of a second portion of the light-emitting panel toward a predetermined left-eye location.

16 Claims, 5 Drawing Sheets

(51) Int. Cl.
*G02B 30/26* (2020.01)
*G02B 30/35* (2020.01)

(52) U.S. Cl.
CPC ............. *G02B 30/26* (2020.01); *G02B 30/35*
(2020.01); *G02B 2027/013* (2013.01); *G02B*
*2027/0123* (2013.01); *G02B 2027/0134*
(2013.01); *G02B 2027/0136* (2013.01); *G02B*
*2027/0159* (2013.01)

(58) Field of Classification Search
CPC ..........................................................................
G02B 27/00; G02B 27/0172; G02B
27/0176; G02B 27/2235; G02B 27/225;
G02B 2027/0123; G02B 27/00134; G02B
2627/00; G02B 27/2228; G02B 27/01;
G02B 27/017; G02B 2830/26; G02B
27/35; G02B 27/0179; G02B 30/26;
G02B 30/35
USPC ....................................................... 359/471
See application file for complete search history.

(56) References Cited

U.S. PATENT DOCUMENTS

| | | | |
|---|---|---|---|
| 4,176,468 A | 12/1979 | Marty, Jr. | |
| 4,293,196 A | 10/1981 | Hilbert | |
| 4,406,532 A | 9/1983 | Howlett | |
| H423 H | 2/1988 | Mohon et al. | |
| 5,184,250 A | 2/1993 | Lacroix | |
| 5,253,116 A | 10/1993 | Lacroix | |
| 5,309,169 A | 5/1994 | Lippert | |
| 5,325,386 A | 6/1994 | Jewell et al. | |
| 5,347,400 A | 9/1994 | Hunter | |
| 5,388,990 A | 2/1995 | Beckman | |
| 5,436,763 A | 7/1995 | Chen et al. | |
| 5,561,538 A | 10/1996 | Kato et al. | |
| 5,572,343 A | 11/1996 | Okamura et al. | |
| 5,581,271 A | 12/1996 | Kraemer | |
| 5,641,288 A | 6/1997 | Zaenglein, Jr. | |
| 5,699,194 A | 12/1997 | Takahashi | |
| 5,701,132 A | 12/1997 | Kollin et al. | |
| 5,701,202 A | 12/1997 | Takahashi | |
| 5,712,649 A | 1/1998 | Tosaki | |
| 5,714,967 A | 2/1998 | Okamura et al. | |
| 5,715,094 A | 2/1998 | Ansley et al. | |
| 5,754,344 A | 5/1998 | Fujiyama | |
| 5,757,544 A | 5/1998 | Tabata et al. | |
| 5,774,268 A | 6/1998 | Takahashi | |
| 5,798,738 A | 8/1998 | Yamada | |
| 5,798,739 A | 8/1998 | Teitel | |
| 5,803,738 A | 9/1998 | Latham | |
| 5,834,676 A | 11/1998 | Elliott | |
| 5,844,530 A | 12/1998 | Tosaki | |
| 5,936,663 A | 8/1999 | Tabata et al. | |
| 5,982,343 A | 11/1999 | Iba et al. | |
| 5,999,147 A | 12/1999 | Teitel | |
| 6,038,387 A | 3/2000 | Machida | |
| 6,140,979 A | 10/2000 | Gerhard et al. | |
| 6,140,980 A | 10/2000 | Spitzer et al. | |
| 6,160,666 A * | 12/2000 | Rallison ............. G02B 27/0101 345/7 |
| 6,185,045 B1 | 2/2001 | Hanano | |
| 6,201,646 B1 | 3/2001 | Togino et al. | |
| 6,215,593 B1 | 4/2001 | Bruce | |
| 6,266,194 B1 | 7/2001 | Tanijiri et al. | |
| 6,347,869 B1 | 2/2002 | Xu et al. | |
| 6,407,724 B2 | 6/2002 | Waldern et al. | |
| 6,445,362 B1 | 9/2002 | Tegreene | |
| 6,504,658 B1 | 1/2003 | Bignolles et al. | |
| 6,522,474 B2 | 2/2003 | Cobb et al. | |
| 6,529,331 B2 | 3/2003 | Massof et al. | |
| 6,549,332 B2 | 4/2003 | Kimura | |
| 6,611,253 B1 | 8/2003 | Cohen | |
| 6,633,304 B2 | 10/2003 | Anabuki et al. | |
| 6,646,811 B2 | 11/2003 | Inoguchi | |
| 6,704,128 B2 | 3/2004 | Takeyama et al. | |
| 6,731,434 B1 | 5/2004 | Hua et al. | |
| 6,751,026 B2 | 6/2004 | Tomono | |
| 6,771,423 B2 | 8/2004 | Geist | |
| 6,788,442 B1 | 9/2004 | Potin et al. | |
| 6,795,042 B1 | 9/2004 | Nagata et al. | |
| 6,813,085 B2 | 11/2004 | Richards | |
| 6,829,087 B2 | 12/2004 | Freese et al. | |
| 6,873,471 B2 | 3/2005 | Coates et al. | |
| 6,919,866 B2 | 7/2005 | Kanevsky et al. | |
| 6,919,867 B2 | 7/2005 | Sauer | |
| 6,963,379 B2 | 11/2005 | Tomono | |
| 7,002,551 B2 | 2/2006 | Azuma et al. | |
| 7,009,773 B2 | 3/2006 | Chaoulov et al. | |
| 7,016,116 B2 | 3/2006 | Dolgoff | |
| 7,063,256 B2 | 6/2006 | Anderson et al. | |
| 7,068,444 B2 | 6/2006 | Nishi | |
| 7,072,096 B2 | 7/2006 | Holman et al. | |
| 7,088,516 B2 | 8/2006 | Yagi et al. | |
| 7,095,562 B1 | 8/2006 | Peng et al. | |
| 7,110,013 B2 | 9/2006 | Ebersole et al. | |
| 7,119,965 B1 | 10/2006 | Rolland et al. | |
| 7,151,639 B2 | 12/2006 | Lung | |
| 7,295,377 B2 | 11/2007 | Edelmann | |
| 7,307,791 B2 | 12/2007 | Li et al. | |
| 7,324,081 B2 | 1/2008 | Friedrich et al. | |
| 7,339,742 B2 | 3/2008 | Amitai et al. | |
| 7,385,600 B2 | 6/2008 | Marion | |
| 7,391,573 B2 | 6/2008 | Amitai | |
| 7,407,106 B2 | 8/2008 | Yee et al. | |
| 7,432,879 B2 | 10/2008 | Schonlau | |
| 7,446,941 B2 | 11/2008 | Fukuda | |
| 7,499,217 B2 | 3/2009 | Cakmakci et al. | |
| 7,545,571 B2 | 6/2009 | Garoutte et al. | |
| 7,547,101 B2 | 6/2009 | Fuziak, Jr. | |
| 7,573,525 B2 | 8/2009 | Yamasaki | |
| 7,605,773 B2 | 10/2009 | Janssen | |
| 7,613,356 B2 | 11/2009 | Uchiyama et al. | |
| 7,623,294 B2 | 11/2009 | Harada et al. | |
| 7,626,562 B2 | 12/2009 | Iwasaki | |
| 7,656,585 B1 | 2/2010 | Powell et al. | |
| 7,663,793 B1 | 2/2010 | Doucet | |
| 7,732,694 B2 | 6/2010 | Rosenberg | |
| 7,751,122 B2 | 7/2010 | Amitai | |
| 7,765,083 B2 | 7/2010 | Zank et al. | |
| 7,804,507 B2 | 9/2010 | Yang et al. | |
| 7,812,815 B2 | 10/2010 | Banerjee et al. | |
| 7,843,403 B2 | 11/2010 | Spitzer | |
| 7,928,927 B1 | 4/2011 | Krenz et al. | |
| 7,949,295 B2 | 5/2011 | Kumar et al. | |
| 7,965,868 B2 | 6/2011 | Roberts et al. | |
| 8,046,719 B2 | 10/2011 | Skourup et al. | |
| 8,059,342 B2 | 11/2011 | Burke | |
| 8,320,217 B1 | 11/2012 | Barger et al. | |
| 8,625,200 B2 * | 1/2014 | Smith .................... G02B 17/06 359/631 |
| 8,678,282 B1 | 3/2014 | Black et al. | |
| 8,766,879 B2 | 7/2014 | Fujikawa et al. | |
| 8,781,794 B2 | 7/2014 | Harrison et al. | |
| 8,884,845 B2 | 11/2014 | Yamazaki et al. | |
| 8,928,558 B2 | 1/2015 | Lewis et al. | |
| 8,964,298 B2 | 2/2015 | Haddick et al. | |
| 9,384,594 B2 | 7/2016 | Maciocci et al. | |
| 9,551,873 B2 | 1/2017 | Zalewski | |
| 2001/0033401 A1 | 10/2001 | Kasai et al. | |
| 2001/0043163 A1 | 11/2001 | Waldern et al. | |
| 2002/0036649 A1 | 3/2002 | Kim et al. | |
| 2002/0047987 A1 | 4/2002 | Massengill et al. | |
| 2002/0094189 A1 | 7/2002 | Navab et al. | |
| 2002/0163486 A1 | 11/2002 | Ronzani et al. | |
| 2002/0181115 A1 | 12/2002 | Massof et al. | |
| 2002/0186179 A1 | 12/2002 | Knowles | |
| 2002/0196554 A1 | 12/2002 | Cobb et al. | |
| 2003/0184868 A1 | 10/2003 | Geist | |
| 2004/0008157 A1 | 1/2004 | Brubaker et al. | |
| 2004/0070839 A1 | 4/2004 | Yagi et al. | |
| 2004/0130783 A1 | 7/2004 | Solomon | |
| 2004/0174599 A1 | 9/2004 | Dietrich | |

(56) References Cited

U.S. PATENT DOCUMENTS

| | | |
|---|---|---|
| 2005/0046953 A1 | 3/2005 | Repetto et al. |
| 2006/0072215 A1 | 4/2006 | Nishi |
| 2006/0103590 A1 | 5/2006 | Divon |
| 2006/0227067 A1 | 10/2006 | Iwasaki |
| 2006/0281061 A1 | 12/2006 | Hightower et al. |
| 2007/0020587 A1 | 1/2007 | Seymore et al. |
| 2007/0097277 A1 | 5/2007 | Hong et al. |
| 2007/0132785 A1 | 6/2007 | Ebersole, Jr. et al. |
| 2007/0177275 A1 | 8/2007 | McGuire, Jr. |
| 2007/0219760 A1 | 9/2007 | Yang et al. |
| 2007/0236800 A1 | 10/2007 | Cakmakci et al. |
| 2007/0242131 A1 | 10/2007 | Sanz-Pastor et al. |
| 2007/0243916 A1 | 10/2007 | Lee |
| 2007/0248283 A1 | 10/2007 | Mack et al. |
| 2007/0273983 A1 | 11/2007 | Hebert |
| 2008/0007181 A1 | 1/2008 | Pickering |
| 2008/0063400 A1 | 3/2008 | Hudson et al. |
| 2008/0071559 A1 | 3/2008 | Arrasvuori |
| 2008/0123049 A1 | 5/2008 | Volk |
| 2008/0130309 A1 | 6/2008 | Condon et al. |
| 2008/0198459 A1 | 8/2008 | Fergason |
| 2008/0204731 A1 | 8/2008 | Williams |
| 2008/0309586 A1 | 12/2008 | Vitale |
| 2009/0002574 A1 | 1/2009 | Sorek et al. |
| 2009/0015735 A1 | 1/2009 | Simmonds |
| 2009/0040308 A1 | 2/2009 | Temovskiy |
| 2009/0112469 A1 | 4/2009 | Lapidot et al. |
| 2009/0122385 A1 | 5/2009 | Hilton |
| 2009/0153437 A1 | 6/2009 | Aharoni |
| 2009/0173788 A1 | 7/2009 | Moraites et al. |
| 2009/0174589 A1 | 7/2009 | Moraites |
| 2009/0190003 A1 | 7/2009 | Park et al. |
| 2009/0228251 A1 | 9/2009 | Cakmakci et al. |
| 2009/0238378 A1 | 9/2009 | Kikinis et al. |
| 2010/0002154 A1 | 1/2010 | Hua |
| 2010/0018285 A1 | 1/2010 | Murphy et al. |
| 2010/0020643 A1 | 1/2010 | Barger et al. |
| 2010/0060551 A1 | 3/2010 | Sugiyama et al. |
| 2010/0103075 A1 | 4/2010 | Kalaboukis et al. |
| 2010/0103196 A1 | 4/2010 | Kumar et al. |
| 2010/0149073 A1 | 6/2010 | Chaum et al. |
| 2010/0165430 A1 | 7/2010 | Buschbeck |
| 2010/0171680 A1 | 7/2010 | Lapidot et al. |
| 2010/0175685 A1 | 7/2010 | Campbell et al. |
| 2010/0214635 A1 | 8/2010 | Sasaki et al. |
| 2010/0238161 A1 | 9/2010 | Varga et al. |
| 2010/0245387 A1 | 9/2010 | Bachelder et al. |
| 2010/0254001 A1 | 10/2010 | Jang |
| 2010/0277575 A1 | 11/2010 | Ismael et al. |
| 2010/0279255 A1 | 11/2010 | Williams, II |
| 2010/0321409 A1 | 12/2010 | Komori et al. |
| 2011/0018903 A1 | 1/2011 | Lapstun et al. |
| 2011/0057863 A1 | 3/2011 | Sugihara et al. |
| 2011/0130636 A1 | 6/2011 | Daniel et al. |
| 2011/0202306 A1 | 8/2011 | Eng et al. |
| 2011/0213664 A1 | 9/2011 | Osterhout et al. |
| 2011/0214082 A1 | 9/2011 | Osterhout et al. |
| 2011/0216060 A1 | 9/2011 | Weising et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King, III et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0228403 A1 | 9/2011 | Masuda et al. |
| 2011/0231757 A1 | 9/2011 | Haddick et al. |
| 2011/0250962 A1 | 10/2011 | Feiner et al. |
| 2011/0283865 A1 | 11/2011 | Collins |
| 2011/0289810 A1 | 12/2011 | D'Souza et al. |
| 2012/0050144 A1 | 3/2012 | Morlock |
| 2012/0068913 A1 | 3/2012 | Bar-Zeev et al. |
| 2012/0120498 A1 | 5/2012 | Harrison et al. |
| 2012/0120499 A1 | 5/2012 | Harrison et al. |
| 2012/0123742 A1* | 5/2012 | Harrison ............ G02B 27/0012 703/1 |
| 2012/0154920 A1 | 6/2012 | Harrison et al. |
| 2012/0204307 A1 | 8/2012 | De Maffei et al. |
| 2012/0212400 A1 | 8/2012 | Border et al. |
| 2012/0242695 A1 | 9/2012 | Martin |
| 2012/0274775 A1 | 11/2012 | Reiffel |
| 2012/0326948 A1 | 12/2012 | Crocco et al. |
| 2013/0016123 A1 | 1/2013 | Skarulis |
| 2013/0021224 A1 | 1/2013 | Fujikawa et al. |
| 2013/0163090 A1 | 6/2013 | Yu |
| 2014/0002677 A1 | 1/2014 | Schinker |
| 2014/0104274 A1 | 4/2014 | Hilliges et al. |
| 2014/0152531 A1* | 6/2014 | Murray ................ G06F 1/1632 345/8 |
| 2014/0182659 A1 | 7/2014 | Davis et al. |
| 2014/0266987 A1 | 9/2014 | Magyari |
| 2015/0103152 A1 | 4/2015 | Qin |
| 2015/0177516 A1 | 6/2015 | Blonde et al. |
| 2015/0178992 A1 | 6/2015 | Bhuruth |
| 2015/0260474 A1 | 9/2015 | Rublowsky et al. |
| 2016/0187969 A1 | 6/2016 | Larsen et al. |

FOREIGN PATENT DOCUMENTS

| | | |
|---|---|---|
| CN | 103261944 A | 8/2013 |
| DE | 102007009828 A1 | 9/2008 |
| EP | 1418458 A1 | 12/2004 |
| EP | 2624238 A1 | 7/2013 |
| GB | 2461907 A | 1/2010 |
| JP | 55-164801 A | 12/1980 |
| JP | 02-032301 A | 2/1990 |
| JP | 05-303054 A | 11/1993 |
| JP | H07134266 A | 5/1995 |
| JP | H07225790 A | 8/1995 |
| JP | H07244246 A | 9/1995 |
| JP | H08190072 A | 7/1996 |
| JP | 08-278476 A | 10/1996 |
| JP | 10-080575 A | 3/1998 |
| JP | 10-206786 A | 8/1998 |
| JP | 2000047138 A | 2/2000 |
| JP | 2002287077 A | 10/2002 |
| JP | 2006039359 A | 2/2006 |
| JP | 2006091477 A | 4/2006 |
| JP | 2008058461 A | 3/2008 |
| JP | 2008529064 A | 7/2008 |
| JP | 2009069364 A | 4/2009 |
| JP | 2009232133 A | 10/2009 |
| JP | 2010019874 A | 1/2010 |
| JP | 2010020065 A | 1/2010 |
| JP | 2010517090 A | 5/2010 |
| JP | 2011133633 A | 7/2011 |
| KR | 10-0292015 B1 | 3/2001 |
| TW | I244318 B | 11/2005 |
| TW | 201326895 A | 7/2013 |
| WO | 9722964 A1 | 6/1997 |
| WO | 2005017729 A2 | 2/2005 |
| WO | 2008051578 A2 | 5/2008 |
| WO | 2009066408 A1 | 5/2009 |
| WO | 2009094643 A2 | 7/2009 |
| WO | 2010047212 A1 | 4/2010 |
| WO | 2010123934 A1 | 10/2010 |
| WO | 2011114149 A1 | 9/2011 |
| WO | 2012052980 A2 | 4/2012 |

(56) References Cited

FOREIGN PATENT DOCUMENTS

| WO | 2012052981 A2 | 4/2012 |
|---|---|---|
| WO | 2012083042 A1 | 6/2012 |

OTHER PUBLICATIONS

Second Office Action for Chinese Patent Application No. 201180067287.4, dated Oct. 10, 2015, 9 pages.
Examination Report for European Patent Application No. 11806088.8, dated Oct. 27, 2015, 3 pages.
Notification of Reason(s) for Rejection for Japanese Patent Application No. JP 2013-544784, dated Aug. 17, 2015, 9 pages.
Final Office Action for U.S. Appl. No. 13/211,365, dated Jun. 15, 2015, 23 pages.
Notice of Allowance for U.S. Appl. No. 13/211,365, dated Sep. 21, 2015, 7 pages.
Non-Final Office Action for U.S. Appl. No. 13/327,217, dated May 21, 2015, 12 pages.
Final Office Action for U.S. Appl. No. 13/327,217, dated Oct. 8, 2015, 15 pages.
Advisory Action for U.S. Appl. No. 13/327,217, dated Jan. 4, 2016, 3 pages.
Non-final Office Action for U.S. Appl. No. 13/211,365, dated Feb. 2, 2016, 15 pages.
Unknown, "Optical head-mounted display," Wikipedia, last modified Feb. 25, 2016, en.wikipedia.org/wiki/Optical_head-mounted_display, 18 pages.
Hua, Hong, "Past and future of wearable augmented reality displays and their applications," SPIE Proceedings, vol. 9186, Oct. 20, 2014, SPIE, pp. 91860O-1 to 91860O-12.
Olwal, Alex, et al., "ASTOR: An Autostereoscopic Optical See-through Augmented Reality System," Proceedings of be Fourth IEEE and ACM International Symposium on Mixed and Augmented Reality, Oct. 5-8, 2005, Vienna, Austria, IEEE, pp. 24-27.
Rolland, Jannick, P., "Wide-angle, off-axis, see-through head-mounted display," Optical Engineering, vol. 39, Issue 7, Jul. 1, 2000, Society of Photo-Optical Instrumentation Engineers, pp. 1760-1767.
Notice of Allowance and Search Report for Taiwanese Patent Application No. 100148681, dated Mar. 14, 2016, 12 pages.
International Search Report and Written Opinion for PCT/US2015/055918, dated Jan. 27, 2016, 9 pages.
Non-Final Office Action for U.S. Appl. No. 14/959,444, dated Jul. 3, 2017, 9 pages.
Non-Final Office Action for U.S. Appl. No. 14/884,975, dated Jul. 12, 2017, 45 pages.
Non-Final Office Action for U.S. Appl. No. 14/858,733, dated Jun. 26, 2017, 11 pages.
Non-Final Office Action for U.S. Appl. No. 15/142,380, dated Jun. 27, 2017, 19 pages.
Decision to Grant a Patent for Japanese Patent Application No. 2013-534454, dated Oct. 18, 2017, 6 pages.
Notification of Reexamination for Chinese Patent Application No. 201180067287.4, dated Sep. 5, 2017, 10 pages.
Decision to Grant a Patent for Japanese Patent Application No. 2013-544784, dated Oct. 18, 2017, 6 pages.
Final Office Action for U.S. Appl. No. 15/058,739, dated Sep. 13, 2017, 16 pages.
International Preliminary Report on Patentability for International Patent Application No. PCT/US2016/020444, dated Sep. 14, 2017, 8 pages.
Amery, John G., et al., "Flight Simulation Visual Requirements and a New Display System," Cockpit Displays VI: Displays for Defense Applications, Proceedings of the SPIE, vol. 3690, Aug. 16, 1999, 16 pages.
Author Unknown, "ABI Research Anticipates 'Dramatic Growth' for Augmented Reality via Smartphones," Human-Machine Technology Research Service, ABI Research, Oct. 22, 2009, 1 page.
Author Unknown, "VST-2200FL Flight Simulator," Virtual SimTech, 2013, http://www.virtualsimtech.com/flightsimulators.htm, 2 pages.
Author Unknown, "Head Mounted Displays from INITION," Retrieved from http://www.inition.co.uk/3D-Technologies/productsection/31, Accessed on Dec. 30, 2011, 4 pages.
Author Unknown, "Immersive Displays: Powerwall, CAVE, Headmounted Displays (HMD)," InterSense Applications, Downloaded at http://www.intersense.com/categories/11/, Accessed on Mar. 7, 2011, InterSense Incorporated, 3 pages.
Author Unknown, "Lumus—Consumer Market Products," Retrieved from http://www.lumus-optical.com/index.php?option=com_content&task=view&id=9&1temid=15, Accessed on Dec. 30, 2011, Lumus Ltd., 4 pages.
Author Unknown, "SEOS Ultra Wide Field-of-View Head Mounted Display," SEOS HMD 120/40, Product Specifications, Retrieved from http://cgsd.com/SEOSHMD/, Accessed on Oct. 31, 2013, SEOS Displays Ltd., 3 pages.
Author Unknown, "Vuzix High Resolution Video Eyewear: The Future of Big Screen Viewing on the Go!," Vuzix Products, Retrieved from http://www.vuzix.com/consumer, Retrieved Dec. 30, 2011, Vuzix, 2 pages.
Ayras et al., "Near-To-Eye Display Based on Retinal Scanning and a Diffractive Exitpupil Expander," Proceedings of SPIE—The International Society for Optical Engineering, Apr. 12-15, 2010, vol. 7723, No. 77230V, SPIE, 8 pages.
Azuma et al., "Improving Static and Dynamic Registration in an Optical See-through HMD," Computer Graphics: Proceedings of SIGGRAPH 1994, Annual Conference Series, Orlando, Florida, Jul. 24-29, 1994, pp. 197-204.
Bayer et al., "Chapter 3: Introduction to Helmet-Mounted Displays," Excerpt from Helmet-Mounted Displays: Sensation, Perception and Cognition Issues, U.S. Army Medical Department, Medical Research and Material Command, USAARL, 2009, 65 pages.
Billinghurst et al., "Collaboration with Tangible Augmented Reality Interfaces," Proceedings of the Ninth International Conference on Human-Computer Interaction, Aug. 2001, vol. 1, 5 pages.
Cakmakci et al., "Meshfree Approximation Methods for Free-Form Surface Representation in Optical Design With Applications to Head-Worn Displays," Proceedings of the SPIE, Aug. 2008, vol. 7061, SPIE, 15 pages.
Cakmakci et al., "Optical Free-Form Surfaces in Off-Axis Head-Worn Display Design," Mixed and Augmented Reality, 7th IEEE/ACM International Symposium, Mar. 2008, pp. 29-32.
Dejong, C. Dean, "Full-Color, See-Through, Daylight-Readable, Goggle-Mounted Display," Proceedings of SPIE—The International Society for Optical Engineering, Apr. 28, 2011, vol. 8041, SPIE, 13 pages.
Feiner, Steven, et al., "MARS—Mobile Augmented Reality Systems," Columbia University, Computer Graphics and User Interfaces Lab, Downloaded at http://graphics.cs.columbia.edu/projects/mars/, Accessed on Mar. 7, 2011, 4 pages.
Ferscha et al., "Wearable Displays-for Everyone!", Pervasive Computing, Jan.-Mar. 2010, vol. 9, No. 1, Institute of Electrical and Electronics Engineers Inc., pp. 7-10.
Haun, Bzur, "Gartner: Mobility market will reach $1 trillion by 2014," Mobility Management News and Blogs, Visage Mobile, Oct. 21, 2010, 2 pages.
Hastings, A., "Eye Box Performance Parameters for Non Pupil Forming. Head/Helmet Mounted Displays," Tutorial, OPT 521, Dec. 6, 2006, www.optics.arizona.edu/optomech/ .. ./tutorials/HastingsTutorial1.doc, 6 pages.
Henderson, Steve, et al., "Augmented Reality for Maintenance and Repair (ARMAR)," Columbia University, Computer Graphics and User Interfaces Lab, Downloaded at http://graphics.cs.columbia.edu/projects/armar/, Jul. 2007, 4 pages.
Holden, Windsor, "A New Reality for Mobile," Whitepaper, Juniper Research Limited, Feb. 2011, 5 pages.
Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu/opti510I/references/mil-hdbk-141/ch7_12.pdf, 20 pages.

(56) References Cited

OTHER PUBLICATIONS

Jeon et al., "Mosaicing a Wide Geometric Field of View for Effective Interaction in Augmented Reality," Mixed and Augmented Reality, 6th IEEE and ACM International Symposium, Mar. 2007, pp. 265-266.
Kato et al., "Marker Tracking and HMD Calibration for a Video-based Augmented Reality Conferencing System," Proceedings of the 2nd IEEE and ACM International Workshop on Augmented Reality, Oct. 1999, San Francisco, California, 10 pages.
Kato et al., "Virtual Object Manipulation on a Table-Top AR Environment," 2000, 9 pages.
Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.
Klepper, Sebastian, "Augmented Reality—Display Systems," Technische Universitaet Muenchen, Munich, Germany, Jul. 4, 2007, http://campar.in.tum.de/twiki/pub/Chair/TeachingSs07ArProseminar/1_Display- Systems_Klepper_Report.pdf.
Kurze et al., "Smart Glasses: An Open Environment for AR Apps," 2010 9th IEEE International Symposium on Mixed and Augmented Reality (ISMAR), Science & Technology Papers, Oct. 13-16, 2010, Seoul, South Korea, p. 313.
Lingley et al., "A Single-Pixel Wireless Contact Lens Display," J. Micromech. Microeng., 21 (2011) 125014 (8pp); doi:1 0.1 088/0960-1317/21/12/125014; Nov. 22, 2011, Received Jun. 9, 2011, in final form Sep. 19, 2011.
Liu et al., "An Optical See-Through Head Mounted Display with Addressable Focal Planes," IEEE Int'l Symposium on Mixed and Augmented Reality, Sep. 15-18, 2008, Cambridge, UK.
Livingston et al., "An Augmented Reality System for Military Operations in Urban Terrain," Proc of I/ITSEC '02, Orlando, FL, Dec. 2-5, 2002.
McClernon, Chris et al., "PC-Based Desktop Display versus Immersive Head-Mounted Display Flight Simulator Performance," Interservice/Industry Training, Simulation, and Education Conference (I/ITSEC), Dec. 2006, http://www.iitsecdocs.com, 7 pages.
Melzer et al., "Guidelines for HMD Design," in Helmet-Mounted Displays: Sensation, Perception and Cognition Issues, C. E. Rash et al., ed., U.S. Army Aeromedical Research Laboratory, Fort Rucker, AL, 2009, Chapter 17, http://www.usaarl.army.mil/publications/hmd_book09/files/Section%2026%20-%20Chapter17%20Guidelines%20for%20HMD%20design.pdf.
Melzer, James E., "Head-Mounted Displays," The Avionics Handbook, Cary R. Spitzer, ed., CRC Press, Boca Raton Florida, 2001, Chapter 5, http://www.davi.ws/avionics/TheAvionicsHandbook_Cap_5.pdf.
Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. PP, No. 99.
Mukawa et al., "A Full Color Eyewear Display Using Holographic Planar Waveguides," IDW'08—Proceedings of the 15th International Display Workshops, Dec. 3-5, 2008, vol. 1, pp. 259-262, Inst. of Image Information and Television Engineers.
Mukawa et al., "A Full-Color Eyewear Display Using Planar Waveguides with Reflection Volume Holograms," Journal of the Society for Information Display, vol. 17, No. 3, pp. 185-193, Mar. 2009, Society for Information Display.
Nagahara et al., "Super Wide Viewer Using Catadioptric Optics," Proc. ACM Symposium on Virtual Reality Software and Technology (VRST2003), Oct. 2003, pp. 169-175, Osaka, Japan.
Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, pp. 3738-3743.
Nagahara et al., "Wide Field of View Head Mounted Display for Tele-Presence with an Omnidirectional Image Sensor," Computer Vision and Pattern Recognition Workshop, Jun. 16-22, 2003, vol. 7, 6 pages.

Okuma et al., "An Augmented Reality System Using a Real-Time Vision Based Registration," Proceedings of the Fourteenth International Conference on Pattern Recognition, Aug. 16-20, 1998, p. 1226, vol. 2.
Parviz, Babak A., "Augmented Reality in a Contact Lens," IEEE Spectrum, Sep. 2009, http://spectrum.ieee.org/biomedical/bionics/augmented-reality-in-a-contact-lens/0.
Perey, Christine, et al., "Where's the Money? Mobile AR Revenue Streams," Mobile AR Summit Position Paper, Downloaded at http://www.perey.com/MobileARSummit/PEREY-Mobile%20AR-Revenue-Streams.pdf, Feb. 9, 2010, 4 pages.
Pratt, P. D., "Advanced Helmet Sight Reticle Assembly (AHRA)," Jul. 1976, p. 364, Honeywell Inc., Minneapolis Minn. Systems and Reresearch Div.
Rolland et al., "Development of Head-Mounted Projection Displays for Distributed, Collaborative, Augmented Reality Applications," Oct. 2005, Presence, vol. 14, No. 5, pp. 528-549.
Rolland et al., "Invited Paper: Head-Worn Displays—Lens Design," 48th Annual SID Symposium, Seminar, and Exhibition 2010, Display Week 2010, May 23-28, 2010, vol. 2, pp. 855-858, Society for Information Display.
Rose, Melinda, "Microdisplays: Coming Soon to an Eye Near You?", Photonics Spectra, Sep. 2008, vol. 42, No. 9, pp. 68-69, Laurin Publishing Co. Inc.
Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE—Int. Soc. Opt. Eng.
Schwald et al., "An Augmented Reality System for Training and Assistance to Maintenance in the Industrial Context," Journal of WSCG, Feb. 3-7, 2003, vol. 11, No. 1, Plzen, Czech Republic.
Spitzer et al., "Video I/0 Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE—Int. Soc. Opt. Eng, USA.
Debevec, Paul, et al., "A Lighting Reproduction Approach to Live-Action Compositing," Proceedings of the 29th annual conference on Computer graphics and interactive techniques (SIGGRAPH), Jul. 21-26, 2002, San Antonio, Texas, ACM, pp. 1-10.
Waese, Jamie, "SIGGRAPH paper: Infrared Chroma Key," waese.com/infrared-chroma-key/, 2015, Jamie Waese, pp. 1-3.
Decision of Final Rejection for Japanese Patent Application No. 2013-534453, dated Jul. 26, 2016, 5 pages.
Patent Examination Report No. 1 for Australian Patent Application No. 2015249168, dated Jun. 27, 2016, 3 pages.
Notification of Reasons for Rejection for Japanese Patent Application No. 2013-534454, dated Jun. 1, 2016, 13 pages.
Notification of Reasons for Rejection for Japanese Patent Application No. 2013-544784, dated May 31, 2016, 11 pages.
Non-Final Office Action for U.S. Appl. No. 14/884,975, dated Sep. 9, 2016, 30 pages.
Non-Final Office Action for U.S. Appl. No. 14/501,509, dated Jul. 15, 2016, 7 pages.
International Search Report and Written Opinion for International Patent Application No. PCT/US2016/020444, dated Jun. 14, 2016, 11 pages.
Non-Final Office Action for U.S. Appl. No. 13/303,607, dated Mar. 20, 2014, 23 pages.
Final Office Action for U.S. Appl. No. 13/303,607, dated Oct. 9, 2014, 27 pages.
Non-Final Office Action for U.S. Appl. No. 13/304,780 dated Jan. 30, 2013, 13 pages.
Final Office Action for U.S. Appl. No. 13/304,780, dated Aug. 15, 2013, 16 pages.
Notice of Allowance and Applicant-Initiated Interview Summary for U.S. Appl. No. 13/304,780, dated Nov. 8, 2013, 15 pages.
Second Office Action for Mexican Patent Application No. MX/a/2013/004453, dated Jan. 19, 2017, 6 pages.
International Preliminary Report on Patentability for International Patent Application No. PCT/IB2011/055820, dated May 2, 2013, 8 pages.

(56) References Cited

OTHER PUBLICATIONS

Examination Report for European Patent Application No. 11806088.8, dated Dec. 7, 2016, 5 pages.
Final Office Action for U.S. Appl. No. 14/884,975, dated Feb. 8, 2017, 36 pages.
International Search Report for International Patent Application No. PCT/US2016/057731, dated Dec. 19, 2016, 12 pages.
Decision of Final Rejection for Japanese Patent Application No. 2013-534454, dated Mar. 31, 2017, 11 pages.
Decision of Final Rejection for Japanese Patent Application No. 2013-544784, dated Mar. 31, 2017, 9 pages.
Notice of Allowance for U.S. Appl. No. 13/211,365, dated Mar. 28, 2017, 4 pages.
Advisory Action for U.S. Appl. No. 14/884,975, dated Apr. 21, 2017, 3 pages.
Non-Final Office Action for U.S. Appl. No. 15/058,739, dated May 23, 2017, 9 pages.
International Preliminary Report on Patentability for International Patent Application No. PCT/US2015/055918, dated Apr. 27, 2017, 6 pages.
Notice of Allowance and Examiner-Initiated Interview Summary for U.S. Appl. No. 13/327,217, dated Mar. 24, 2017, 12 pages.
Examination Report for European Patent Application No. 11815631.4, dated Apr. 13, 2016, 11 pages.
Third Office Action for Chinese Patent Application No. 201180067287.4, dated Apr. 12, 2016, 10 pages.
Final Office Action for U.S. Appl. No. 13/211,365, dated Jul. 11, 2016, 13 pages.
Non-Final Office Action for U.S. Appl. No. 13/327,217, dated Jun. 2, 2016, 18 pages.
Office Action for Mexican Patent Application No. MX/a/2013/004453, dated Oct. 12, 2016, 3 pages.
Notice of Acceptance for Australian Patent Application No. 2015249168, dated Nov. 4, 2016, 2 pages.
Office Action for Mexican Patent Application No. MX/a/2013/004454, dated Oct. 12, 2016, 3 pages.
Decision of Rejection for Chinese Patent Application No. 201180067287.4, dated Oct. 17, 2016, 14 pages.
Advisory Action for U.S. Appl. No. 13/211,365, dated Nov. 7, 2016, 3 pages.
Applicant-Initiated Interview Summary for U.S. Appl. No. 13/211,365, dated Nov. 17, 2016, 4 pages.
Notice of Allowance and Applicant-Initiated Interview Summary for U.S. Appl. No. 13/211,365, dated Nov. 23, 2016, 9 pages.
Final Office Action for U.S. Appl. No. 13/327,217, dated Nov. 30, 2016, 24 pages.
Final Office Action for U.S. Appl. No. 14/884,975, dated Dec. 11, 2017, 45 pages.
Notice of Allowance for U.S. Appl. No. 15/058,739, dated Nov. 30, 2017, 8 pages.
Corrected Notice of Allowance for U.S. Appl. No. 15/058,739, dated Dec. 7, 2017, 5 pages.
Final Office Action for U.S. Appl. No. 14/858,733, dated Dec. 22, 2017, 17 pages.
Final Office Action for U.S. Appl. No. 15/142,380, dated Nov. 3, 2017, 27 pages.
Notification of Reason for Rejection for Japanese Patent Application No. 2016-229136, dated Oct. 30, 2017, 5 pages.
Office Action for Canadian Patent Application No. 2,815,461, dated Oct. 26, 2017, 4 pages.
Office Action for Canadian Patent Application No. 2,821,401, dated Oct. 17, 2017, 4 pages.
Office Action for Korean Patent Application No. 10-2013-701735, dated Oct. 30, 2017, 10 pages.
Office Action for Canadian Patent Application No. 2,815,452, dated Oct. 31, 2017, 4 pages.
Office Action for Korean Patent Application No. 10-2013-7013039, dated Dec. 18, 2017, 9 pages.
Examination Report for European Patent Application No. 11815630.6, dated Dec. 13, 2017, 6 pages.

Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.
Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.
Upton et al., "Eyeglass Head-Up Display [Vibrating Fiber Optic Assembly," 1981 SID International Symposium, Digest of Papers, Apr. 28-30, 1981, vol. XII, pp. 48-49, New York, NY, SID, Los Angeles, CA.
Vanden Brook, T., "Device Helps Pinpoint Snipers: Technology is Critical for U.S. Combat Troops," USA Today, Wednesday, Mar. 2, 2011.
Von Waldkirch et al., "Spectacle-Based Design of Wearable See-Through Display for Accommodation-Free Viewing," Proceedings of the Second International Conference on Pervasive Computing, (Lecture Notes in Comput. Sci. vol. 3001 ), Apr. 18-23, 2004, pp. 106-123, Springer-Verlag, Berlin, Germany.
Wang, Robert Y. et al., "Real-time hand-tracking with a color glove," retrieved Dec. 16, 2014 from http://people.csail.mit.edu/rywang/hand/, 3 pages.
Yang et al., "Hybrid Diffractive-Refractive 67 degree-Diagonal Field of View Optical See-Through Head-Mounted Display," Institute of Modem Optics, Aug. 17, 2005, pp. 351-355, vol. 116, No. 7, Optik—Internat, Nankai University, Tianjin, China.
Yavrucuk, I. et al., "A Low Cost Flight Simulator Using Virtual Reality Tools," IEEE Aerospace and Electronics Systems Magazine, vol. 26, Issue 4, Apr. 2011, IEEE, pp. 10-14.
International Search Report for PCT/IB2011/055824 dated May 16, 2012, 4 pages.
Written Opinion of the International Searching Authority for PCT/IB2011/055824 dated May 2, 2013, 5 pages.
International Preliminary Report on Patentability for PCT/IB2011/055824 dated May 2, 2013, 7 pages.
Examination Report for Australian Patent Application No. 2011319480 dated Oct. 27, 2014, 3 pages.
Examination Report for Australian Patent Application No. 2011319481 dated Oct. 23, 2014, 3 pages.
Examination Report for Australian Patent Application No. 2011343660 dated Oct. 31, 2014, 3 pages.
International Search Report for PCT/IB2011/055820 dated May 21, 2012, 4 pages.
International Search Report and Written Opinion for PCT/US2011/065201 dated Mar. 7, 2012, 14 pages.
International Preliminary Report on Patentability for PCT/US2011/065201 dated Jun. 27, 2013, 11 pages.
International Search Report for PCT/IB2011/055826 dated Sep. 14, 2012, 4 pages.
International Preliminary Report on Patentability for PCT/IB2011/055826 dated May 2, 2013, 11 pages.
First Office Action for Chinese Patent Application No. 201180060659.0, dated Nov. 3, 2014, 10 pages.
First Office Action for Chinese Patent Application No. 201180060662.2, dated Nov. 2, 2014, 13 pages.
Non-final Office Action for U.S. Appl. No. 13/211,365 dated Oct. 24, 2012, 12 pages.
Final Office Action for U.S. Appl. No. 13/211,365 dated Feb. 22, 2013, 15 pages.
Non-final Office Action and Examiner-Initiated Interview Summary for U.S. Appl. No. 13/211,365 dated Jun. 14, 2013, 18 pages.
Final Office Action for U.S. Appl. No. 13/211,365 dated Oct. 18, 2013, 22 pages.
Non-final Office Action for U.S. Appl. No. 13/211,365 dated Apr. 22, 2014, 9 pages.
Notice of Allowance for U.S. Appl. No. 13/211,365, dated Aug. 8, 2014, 7 pages.
Non-Final Office Action for U.S. Appl. No. 13/211,365, dated Jan. 12, 2015, 20 pages.
Non-final Office Action for U.S. Appl. No. 13/211,372 dated Nov. 21, 2012, 9 pages.

(56) References Cited

OTHER PUBLICATIONS

Non-final Office Action for U.S. Appl. No. 13/211,372 dated Mar. 7, 2013, 12 pages.
Final Office Action for U.S. Appl. No. 13/211,372 dated Aug. 1, 2013, 7 pages.
Notice of Allowance for U.S. Appl. No. 13/211,372 dated Sep. 6, 2013, 8 pages.
Non-final Office Action for U.S. Appl. No. 13/211,389 dated Feb. 26, 2013, 21 pages.
Final Office Action for U.S. Appl. No. 13/211,389 dated Jul. 12, 2013, 25 pages.
Notice of Allowance and Applicant-Initiated Interview Summary for U.S. Appl. No. 13/211,389 dated Sep. 19, 2013, 10 pages.
Notice of Allowance for U.S. Appl. No. 13/211,389 dated Jan. 6, 2014, 8 pages.
Non-final Office Action for U.S. Appl. No. 13/327,217 dated Jan. 17, 2014, 14 pages.
Final Office Action for U.S. Appl. No. 13/327,217 dated Jul. 31, 2014, 13 pages.
Advisory Action for U.S. Appl. No. 13/327,217 dated Nov. 5, 2014, 3 pages.
Office Action for Mexican Patent Application No. MX/a/2013/006722, dated Dec. 8, 2014, 7 pages.
Examination Report for European Patent Application No. 11815630.6, dated Nov. 20, 2015, 4 pages.
Notification of Reason(s) for Rejection for Japanese Patent Application No. 2013-534453, dated Dec. 22, 2015, 9 pages.
Patent Examination Report No. 2 for Australian Patent Application No. 2011343660, dated Oct. 22, 2015, 3 pages.
Notice of Acceptance for Australian Patent Application No. 2011319481, dated Oct. 12, 2015, 3 pages.
Second Office Action for Chinese Patent Application No. 201180060659.0, dated Jun. 30, 2015, 6 pages.
Third Office Action for Chinese Patent Application No. 201180060659.0, dated Dec. 15, 2015, 6 pages.
Notification of Reason(s) for Rejection for Japanese Patent Application No. JP 2013-534454, dated Sep. 17, 2015, 7 pages.
Office Action and Search Report for Taiwanese Patent Application No. 100148694, dated Dec. 1, 2015, 18 pages.
Second Office Action for Chinese Patent Application No. 201180060662.2, dated Jun. 10, 2015, 7 pages.
Office Action and Search Report for Taiwanese Patent Application No. 100148681, dated Oct. 5, 2015, 15 pages.
Decision to Grant a Patent for Japanese Patent Application No. 2016-229136, dated May 8, 2018, 6 pages.
Examination Report for Indian Patent Application No. 1121/MUMNP/2013, dated Apr. 26, 2018, 7 pages.
Grant of Patent for Korean Patent Application No. 10-2013-7017315, dated Apr. 26, 2018, 5 pages.
International Preliminary Report on Patentability for International Patent Application No. PCT/US2016/057731, dated May 3, 2018, 9 pages.
Examination Report for Indian Patent Application No. 957/MUMNP/2013, dated Jun. 6, 2018, 5 pages.
Advisory Action for U.S. Appl. No. 14/959,444, dated Apr. 18, 2018, 5 pages.
Non-Final Office Action for U.S. Appl. No. 14/959,444, dated Jul. 3, 2018, 15 pages.
Applicant-Initiated Interview Summary for U.S. Appl. No. 14/858,733, dated Jul. 9, 2018, 4 pages.
First Examination Report for Indian Patent Application No. 959/MUMNP/2013, dated Jul. 31, 2018, 6 pages.
Notice of Final Rejection for Korean Patent Application No. 10-2013-7013039, dated Jul. 20, 2018, 5 pages.
Examination Report for European Patent Application No. 11815631.4, dated Jun. 11, 2018, 6 pages.
Grant of Patent for Korean Patent Application No. 10-2013-7013038, dated Aug. 22, 2018, 3 pages.
Examiner's Answer for U.S. Appl. No. 14/884,975, dated Jul. 18, 2018, 23 pages.
Final Office Action for U.S. Appl. No. 14/959,444, dated Jan. 16, 2018, 11 pages.
Notice of Allowance for U.S. Appl. No. 15/142,380, dated Feb. 7, 2018, 5 pages.
Advisory Action for U.S. Appl. No. 14/884,975, dated Feb. 23, 2018, 3 pages.
Non-Final Office Action for U.S. Appl. No. 14/858,733, dated Apr. 5, 2018, 23 pages.
Decision of Reexamination for Chinese Patent Application No. 201180067287.4, dated Feb. 11, 2018, 23 pages.
First Office Action for Korean Patent Application No. 10-2013-7013038, dated Mar. 5, 2018, 9 pages.
Office Action for Taiwanese Patent Application No. 104134259, dated Jan. 16, 2019, 9 pages.
Quayle Action for U.S. Appl. No. 14/959,444, dated Feb. 5, 2019, 5 pages.
Applicant-Initiated Interview Summary for U.S. Appl. No. 14/858,733, dated Jan. 22, 2019, 6 pages.
Notice of Allowance for U.S. Appl. No. 14/858,733, dated Mar. 4, 2019, 7 pages.
Notice of Allowance for U.S. Appl. No. 14/959,444, dated Jul. 3, 2019, 8 pages.
Corrected Notice of Allowability for U.S. Appl. No. 14/858,733, dated Apr. 17, 2019, 5 pages.
Corrected Notice of Allowability for U.S. Appl. No. 14/858,733, dated May 20, 2019, 6 pages.
Extended European Search Report for European Patent Application No. 16858143.7, dated Jul. 3, 2019, 9 pages.
Final Office Action for U.S. Appl. No. 14/858,733, dated Nov. 8, 2018, 6 pages.
Corrected Notice of Allowability for U.S. Appl. No. 14/959,444, dated Aug. 13, 2019, 5 pages.
Preliminary Office Action for Brazilian Patent Application No. 112013009856-2, dated Oct. 15, 2019, 6 pages.
Grant of Patent for Korean Patent Application No. 10-2013-7013039, dated Sep. 5, 2018, 2 pages.
Corrected Notice of Allowability for U.S. Appl. No. 14/959,444, dated Oct. 25, 2019, 5 pages.
Decision on Appeal for U.S. Appl. No. 14/884,975, dated Nov. 25, 2019, 14 pages.
Notice of Allowance for U.S. Pat. No. 14,884,975, dated Feb. 10, 2020, 14 pages.

* cited by examiner

MULTIPLE-EYE, SINGLE-DISPLAY, ULTRAWIDE-FIELD-OF-VIEW OPTICAL SEE-THROUGH AUGMENTED REALITY SYSTEM

TECHNICAL FIELD

The embodiments relate generally to optical systems and, in particular, to a single-display optical see-through augmented reality system.

BACKGROUND

See-through augmented reality systems that provide different imagery to two eyes require two display systems. Using two display systems increases costs and complexity, requires substantial alignment, and reduces reliability.

SUMMARY

The embodiments relate to an augmented reality system that utilizes a single-display system to provide different imagery to two different eyes of a user.

In one embodiment, an optical system is provided. The optical system includes a lens element and a lens element holder that is configured to position the lens element with respect to eyes of the user. The optical system also includes a display device holder that is configured to hold a display device having a single light-emitting panel. The lens element includes a right-eye reflective surface and a left-eye reflective surface. The right-eye reflective surface includes a first plurality of different surface elements oriented to reflect and collimate light from corresponding different regions of a first portion of the light-emitting panel toward a predetermined right-eye location, and the left-eye reflective surface includes a second plurality of different surface elements oriented to reflect and collimate light from corresponding different regions of a second portion of the light-emitting panel toward a predetermined left-eye location. The display device holder is configured to maintain the light-emitting panel in a predetermined position and orientation with respect to the lens element to reflect light emitted from the light-emitting panel from the right-eye reflective surface toward the predetermined right-eye location and the left-eye reflective surface toward the predetermined left-eye location.

In one embodiment, the optical system further includes a support coupled to the lens element holder and the display device holder. The support is configured to be mounted on a helmet.

In one embodiment, the lens element comprises a single lens element. In one embodiment, the right-eye reflective surface and the left-eye reflective surface are each non-symmetrical concave surfaces and join at a center region of the single lens element. In another embodiment, the lens element comprises a first lens element and a second lens element that is separate from the first lens element, and the first lens element comprises the right-eye reflective surface, and the second lens element comprises the left-eye reflective surface.

In one embodiment, the light-emitting panel is configured to concurrently provide left-eye imagery from the first portion of the light-emitting panel and right-eye imagery from the second portion of the light-emitting panel.

In one embodiment, the first plurality of different surface elements oriented to reflect and collimate light from corresponding different regions of the first portion of the light-emitting panel is further oriented to reflect light received from the second portion of the light-emitting panel in a direction other than toward the right eye of the user.

In one embodiment, the display device holder is configured to receive a portable display device. In one embodiment, the display device holder is configured to maintain the light-emitting panel above and in front of the eyes of the user.

In one embodiment, the optical system further comprises a lens element adjustment mechanism that is configured to alter a distance of the lens element from the light-emitting panel.

In one embodiment, the lens element may be partially transparent and partially reflective, such as is implemented by a beam-splitter. The lens element may thus provide a see-through augmented reality mode, wherein eyes of a user can perceive real-world imagery through the lens element in conjunction with imagery reflected from the interior reflective surfaces of the lens element. The lens element may also provide a completely reflective mode, wherein eyes of the user receive only imagery reflected from the interior reflective surfaces of the lens element, which facilitates a completely immersive virtual reality experience.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first lens element" and "second lens element," and does not imply a priority, a type, an importance, or other attribute, unless otherwise stated herein. The term "about" used herein in conjunction with a numeric value means any value that is within a range of ten percent greater than or ten percent less than the numeric value.

Figure 1:
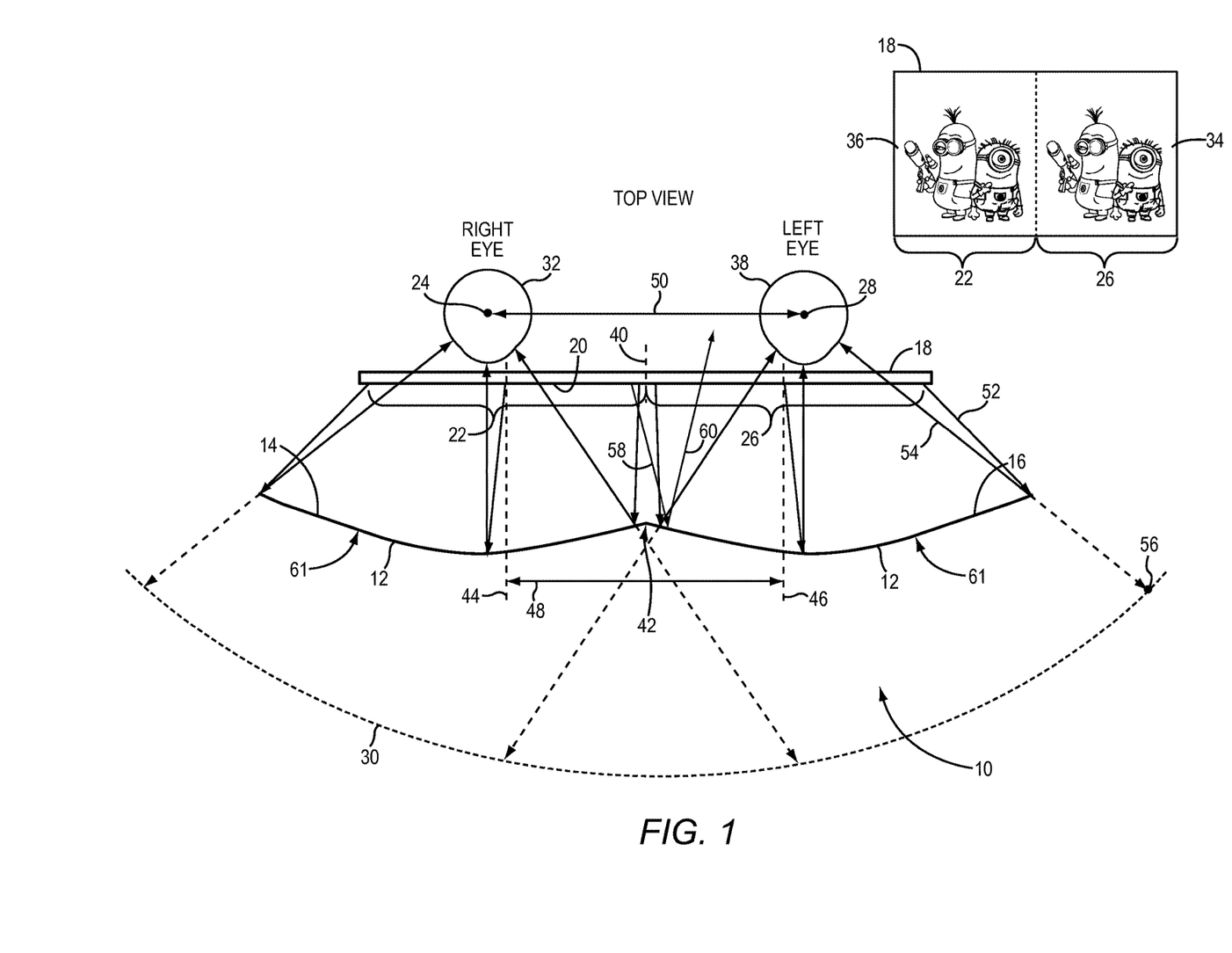
FIG. 1 is a block diagram illustrating a plan view of an optical system according to one embodiment.

FIG. 1 is a block diagram illustrating a plan view of an optical system 10 according to one embodiment. The optical system 10 includes a lens element 12, which has a right-eye reflective surface 14 and a left-eye reflective surface 16. A display device 18 has a single light-emitting panel 20 (hereinafter "light-emitting panel 20"). The phrase "single light-emitting panel" refers to one light-emitting panel that utilizes a single set of drivers and has a single set of driving electronics, such as, for example, is found in a typical smartphone.

The right-eye reflective surface 14 and the left-eye reflective surface 16 are non-rotationally symmetric surfaces, and, in some embodiments, concave surfaces, that are "mapped" to the light-emitting panel 20. In particular, the right-eye reflective surface 14 comprises a first plurality of different surface elements oriented to reflect and collimate light from corresponding regions of a first portion 22 of the light-emitting panel 20 toward a predetermined right-eye location 24. Similarly, the left-eye reflective surface 16 comprises a second plurality of different surface elements oriented to reflect and collimate light from corresponding regions of a second portion 26 of the light-emitting panel 20 toward a predetermined left-eye location 28. Thus, the right-eye reflective surface 14 comprises a surface that comprises multiple, such as thousands, of different surface elements that are mapped to corresponding regions of the first portion 22 of the light-emitting panel 20. Similarly, the left-eye reflective surface 16 comprises a surface that comprises multiple, such as thousands, of different surface elements that are mapped to corresponding regions of the second portion 26 of the light-emitting panel 20.

Such mapping may be implemented, for example, as disclosed in U.S. Pat. No. 8,781,794 (hereinafter the '794 Patent), the contents of which are incorporated by reference herein. As disclosed in the '794 Patent, non-symmetrical lens surfaces, such as the right-eye reflective surface 14 can be engineered to, among other advantages, increase a field of view (FOV) 30 of a user, such that imagery presented by the light-emitting panel 20 can be reflected from a desired surface element or surface elements of the right-eye reflective surface 14 toward the predetermined right-eye location 24. Such surface elements may overlap one another. In some embodiments, the optical system 10 can provide a 180-degree FOV 30. Such an engineered surface can also effectively shift imagery presented by the first portion 22 toward the predetermined right-eye location 24 in a manner that prevents skewing or other aberrations to a right eye 32.

The light-emitting panel 20 is configured to concurrently provide right-eye imagery 34 from the first portion 22 of the light-emitting panel 20 and left-eye imagery 36 from the second portion 26 of the light-emitting panel 20. The ability for a single light-emitting panel to provide two sets of imagery can be implemented in a number of different ways, including, by way of non-limiting example, via Pinnacle Studio software, available from Corel Corporation, 1600 Carling Avenue, Ottawa, Ontario, K1Z 8R7, Canada. The use of two sets of imagery facilitates, for example, 3D imagery being presented by the first portion 22 and the second portion 26. The right-eye reflective surface 14 reflects the 3D imagery presented by the first portion 22 to the right eye 32 of the user, and the left-eye reflective surface 16 reflects the 3D imagery presented by the second portion 26 to a left eye 38 of the user.

Note that a center 40 of the light-emitting panel 20 is preferably aligned with a center region 42 of the single lens element 12, wherein the right-eye reflective surface 14 and the left-eye reflective surface 16 join. Due to the engineered right-eye reflective surface 14, a center 44 of the first portion 22 need not align with a center of the right-eye reflective surface 14, nor with the right eye 32. Similarly, due to the engineered left-eye reflective surface 16, a center 46 of the second portion 26 need not align with a center of the left-eye reflective surface 16, nor with the left eye 38. Similarly, a first distance 48 between a center point of the first portion 22 of the light-emitting panel 20 and a center point of the second portion 26 of the light-emitting panel 20 may be less than a second distance 50 between the predetermined right-eye location 24 and the predetermined left-eye location 28.

As an example of the effect of the engineered left-eye reflective surface 16, light 52 may be emitted from a region of the second portion 26 of the light-emitting panel 20. The light 52 is reflected from a surface element located on the left-eye reflective surface 16 in a direction 54 toward the predetermined left-eye location 28. To the left eye 38, the imagery carried in the light 52 may be perceived to be at a location 56. It will be appreciated that the light 52, although illustrated as striking the particular surface element located on the left-eye reflective surface 16, in fact travels in waves and may strike multiple other surface elements on the left-eye reflective surface 16, and indeed may strike all other surface elements on the left-eye reflective surface 16. However, since such other surface elements are oriented to reflect light received from different regions of the second portion 26, the light 52 will be reflected in a direction other than the predetermined left-eye location 28. For example, light 58 emitted from a region of the first portion 22 of the light-emitting panel 20 may strike a surface element of the left-eye reflective surface 16, and is thus reflected in a direction 60 away from the predetermined left-eye location 28.

In some embodiments, the lens element 12 is partially transparent and partially reflective and comprises, for example, a beam splitter. In some embodiments, the right-eye reflective surface 14 and the left-eye reflective surface 16 may be coated with a material, such as chromium, aluminum, or the like, to provide such partially reflective properties. In such embodiments, the optical system 10 may operate in an augmented reality mode, wherein the eyes 32, 38 can view a mixture of real-world environment through the lens element 12 and imagery from the light-emitting panel 20 via one or both of the left-eye reflective surface 16 and the right-eye reflective surface 14. The lens element 12 may also provide a completely reflective mode, wherein the eyes 32, 38 receive only imagery reflected from the reflective surfaces 14, 16, which facilitates a completely immersive virtual reality experience.

In one embodiment, exterior surfaces 61 of the lens element 12 may be coated with an anti-reflective (AR) coating. The use of an AR coating may substantially reduce double-imaging that may occur in certain circumstances, wherein some light emitted by the light-emitting panel 20 passes through the interior reflective surfaces 14, 16 and is reflected back by the exterior surfaces 61 toward the eyes 32, 38. The use of an AR coating on the exterior surfaces 61 can cause some, or all, of such light to pass through the lens element 12 rather than reflect back toward the eyes 32, 38. The AR coating may comprise any suitable coating, such as, by way of non-limiting example, a dielectric such as silicon dioxide, and the like.

Figure 2:
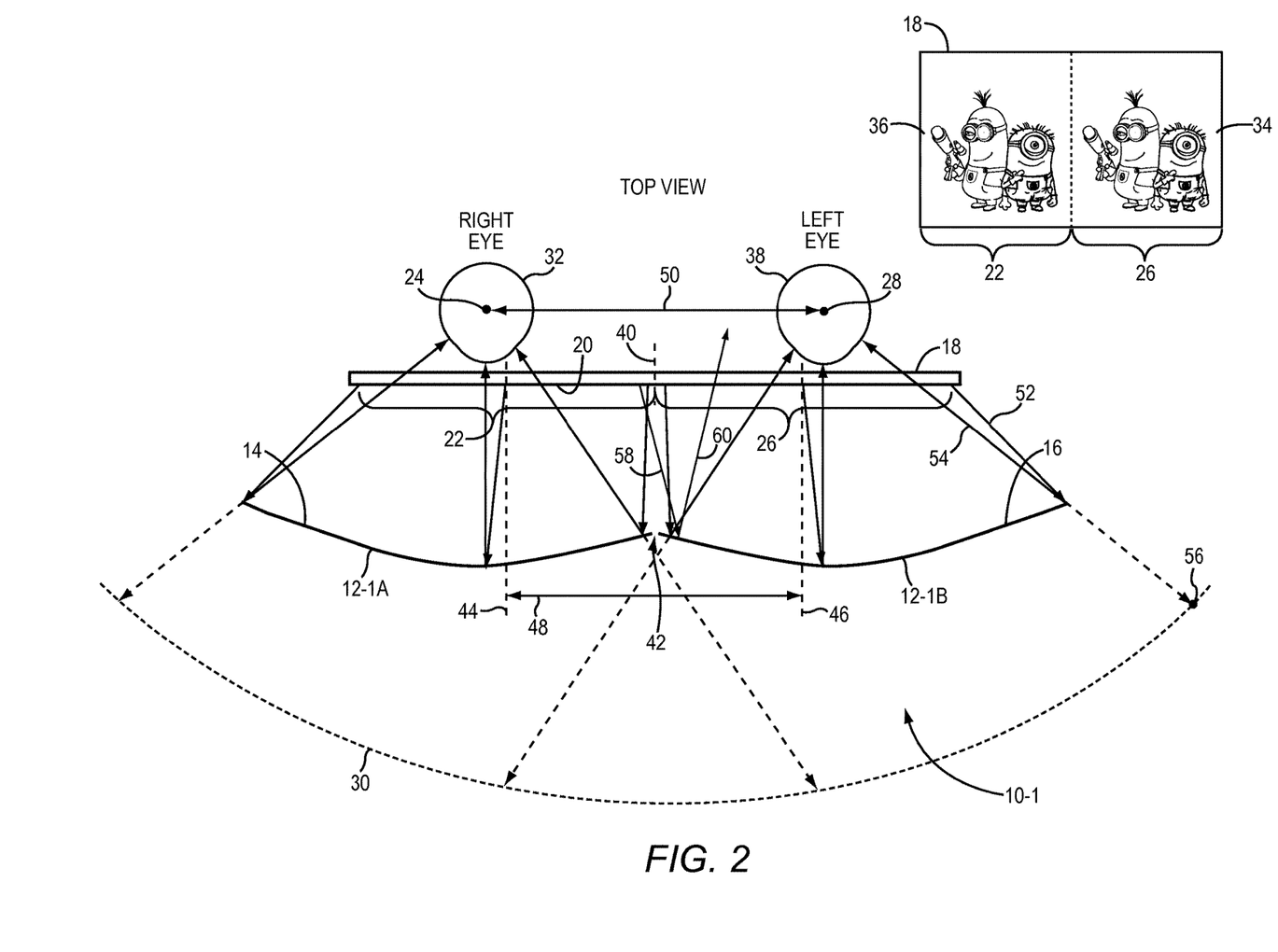
FIG. 2 is a block diagram illustrating a plan view of an optical system according to another embodiment.

FIG. 2 is a block diagram illustrating a plan view of an optical system 10-1 according to another embodiment. The optical system 10-1 operates substantially similarly to the optical system 10, except in this embodiment a first lens element 12-1A comprises the right-eye reflective surface 14, and a second lens element 12-1B comprises the left-eye reflective surface 16. The first lens element 12-1A and the second lens element 12-1B may be moved different distances from one another to accommodate different distances 50 between the eyes 32, 38 of different users. This interpupillary distance adjustment can also be facilitated by having different sized lenses computed and constructed for users having different sized heads, and may also be adjusted by shifting the imagery to the left and right in opposite eyes. The imagery may be displaced closer to the nose for users having eyes closer together, or displaced away from the nose for users having wider-spaced eyes.

Figure 3:
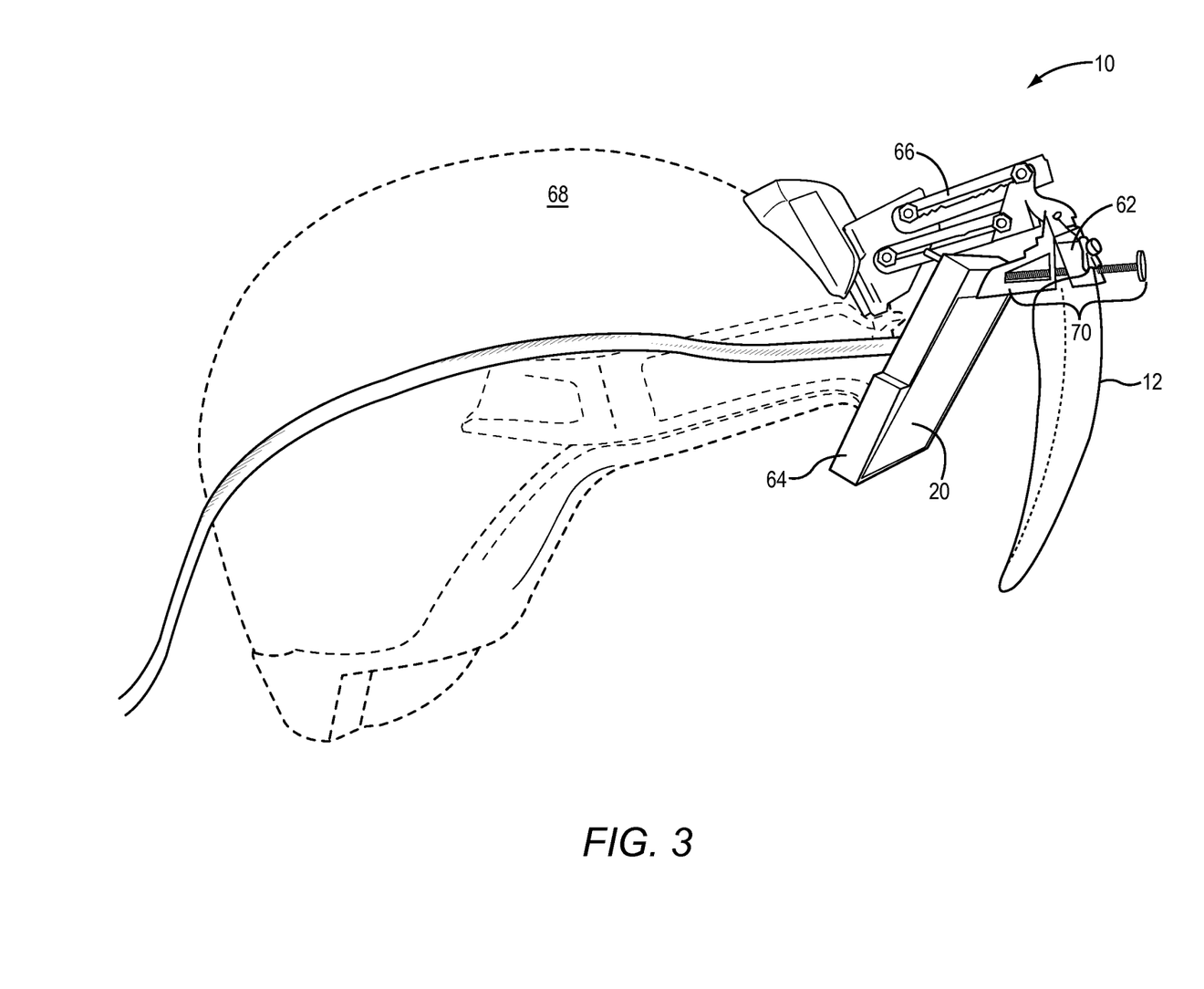
FIG. 3 is a perspective view illustrating the optical system according to one embodiment.

FIG. 3 is a perspective view illustrating the optical system 10, according to one embodiment. The optical system 10 may include a lens element holder 62 configured to position the lens element 12 with respect to eyes of the user. The optical system 10 may also include a display device holder 64 configured to hold the display device 18 (FIG. 1) having the light-emitting panel 20. The display device holder 64 is configured to maintain the light-emitting panel 20 in a predetermined position and orientation with respect to the lens element 12 to reflect light emitted from the light-emitting panel 20 from the right-eye reflective surface 14 toward the predetermined right-eye location 24 and from the left-eye reflective surface 16 toward the predetermined left-eye location 28. The display device holder 64 may also be configured to maintain the light-emitting panel 20 above and in front of the eyes of the user. The optical system 10 may also include a support 66 that is coupled to the lens element holder 62 and the display device holder 64, which is configured to be mounted on a helmet 68.

The optical system 10 may also include a lens element adjustment mechanism 70 that is configured to alter a distance of the lens element 12 from the light-emitting panel 20, and/or the eyes of the user, for focusing and alignment purposes.

Figure 4:
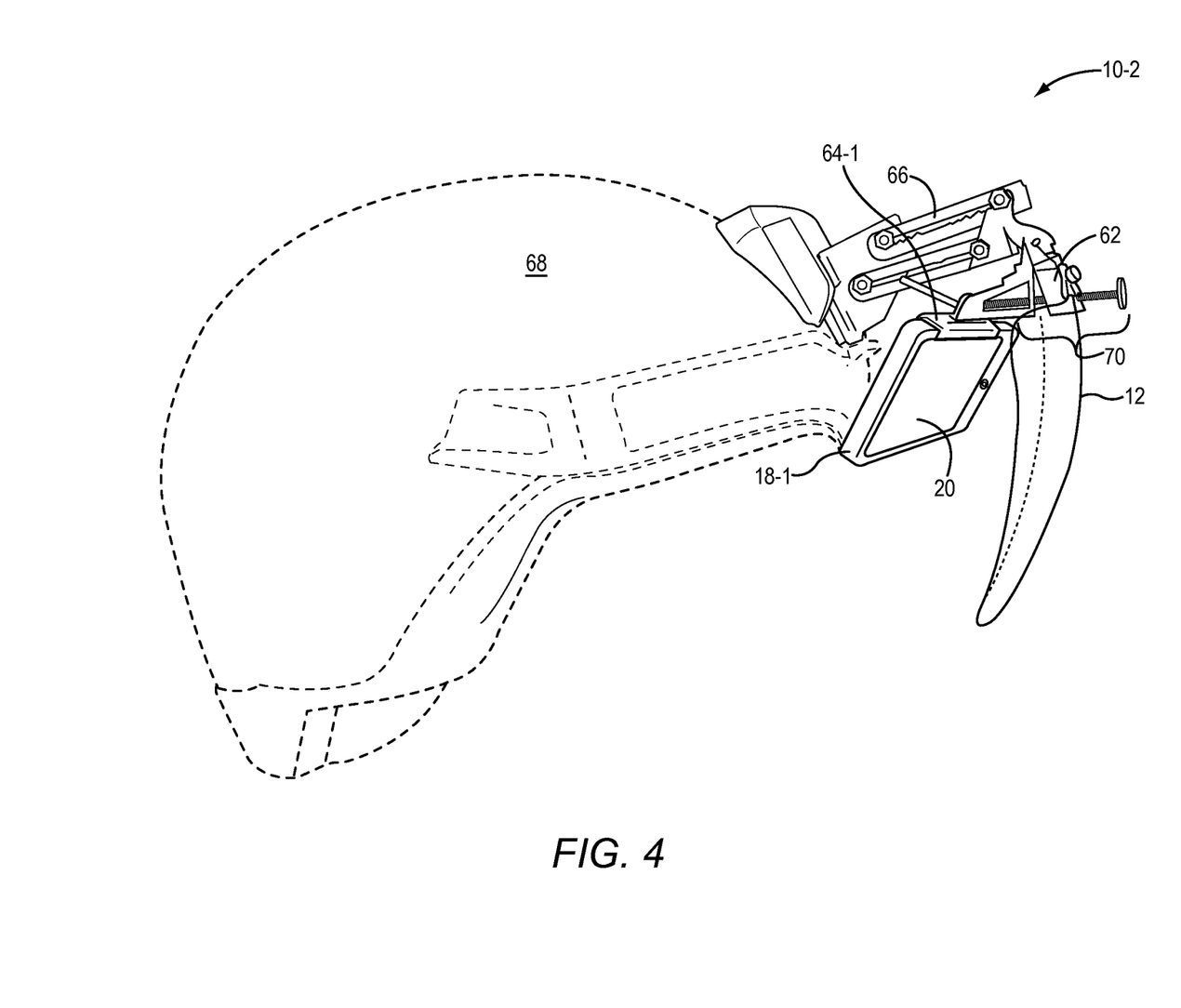
FIG. 4 is a perspective view illustrating an optical system according to another embodiment.

FIG. 4 is a perspective view illustrating an optical system 10-2, according to one embodiment. The optical system 10-2 is substantially similar to the optical system 10-1, except in this embodiment a display device holder 64-1 is configured to receive a portable display device 18-1, such as a smartphone or computing tablet.

Figure 5:
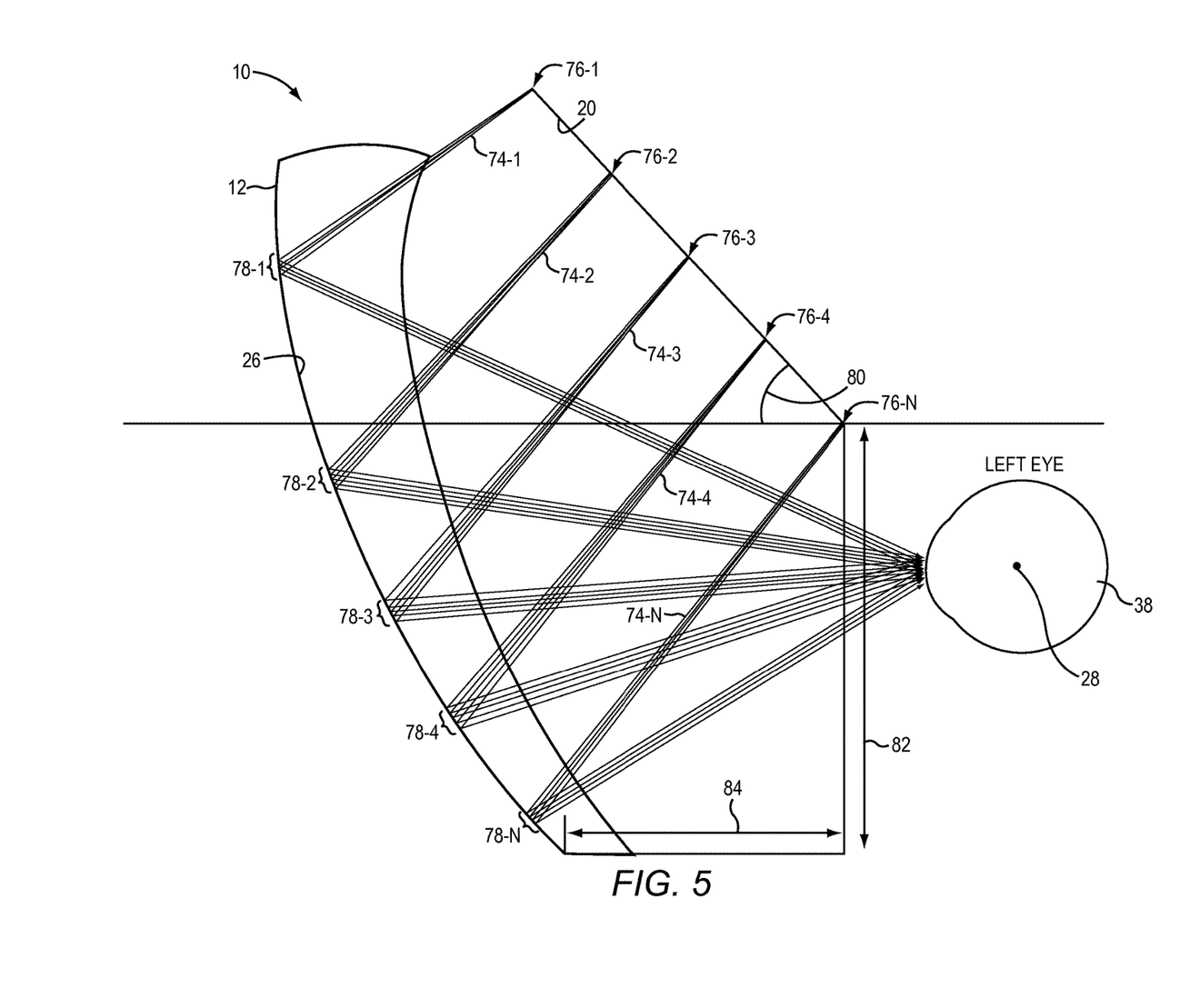
FIG. 5 is a diagram illustrating a side view of the optical system according to one embodiment.

FIG. 5 is a diagram illustrating a side view of the optical system 10, according to one embodiment. The second portion 26 of the light-emitting panel 20 emits light 74-1-74-N from a plurality of different regions 76-1-76-N (generally, regions 76) of the second portion 26. A region 76 may comprise, for example, a pixel, or a group of pixels. Corresponding surface elements 78-1-78-N (generally, surface elements 78) on the left-eye reflective surface 16 (FIG. 1) have each been mapped to the regions 76. A surface element 78 may comprise, for example, a particular area size on the left-eye reflective surface 16.

Each surface element 78 both collimates and reflects the corresponding light 74 toward the predetermined left-eye location 28. While for purposes of illustration only five regions 76 and five surface elements 78 are depicted, it will be appreciated that depending on the imagery, the size of the regions 76, and the size of the surface elements 78, light 74 may be emitted from tens or hundreds of thousands of different regions 76 and collimated and reflected by corresponding tens or hundreds of thousands of different surface elements 78 toward the predetermined left-eye location 28.

While the precise parameters of the optical system 10 may differ depending on the application, or the second distance 50 between the predetermined right- and left-eye locations 24, 28 (FIG. 1), in one embodiment, the display device holder 64 (FIG. 3) maintains the light-emitting panel 20 at an approximately 48-degree angle 80 with respect to horizontal. A distance 82 between a base of the light-emitting panel 20 and the bottom of the lens element 12 is about 62.8 millimeters (mm). A distance 84 between the base of the lens element 12 and a vertical line extending from the base of the light-emitting panel 20 is about 39.8 mm.

Those skilled in the art will recognize improvements and modifications to the preferred embodiments of the disclosure. All such improvements and modifications are considered within the scope of the concepts disclosed herein and the claims that follow.

What is claimed is:

1. An optical system comprising:
   a lens element;
   a lens element holder configured to position the lens element with respect to eyes of a user;
   a display device having a single light-emitting panel;
   a display device holder configured to hold the display device, the light-emitting panel configured to concurrently provide left-eye imagery from a first portion of the light-emitting panel and right-eye imagery from a second portion of the light-emitting panel;
   wherein the lens element comprises a right-eye reflective surface and a left-eye reflective surface, the right-eye reflective surface comprising a first plurality of different surface elements oriented to receive light directly from the first portion of the light-emitting panel with no intervening elements between the first portion of the light-emitting panel and the right-eye reflective surface, and to reflect and collimate light from corresponding different regions of the first portion of the light-emitting panel directly to a predetermined right-eye location and the left-eye reflective surface comprising a second plurality of different surface elements oriented to receive light directly from the second portion of the light-emitting panel with no intervening elements between the second portion of the light-emitting panel and the left-eye reflective surface, and to reflect and collimate light from corresponding different regions of the second portion of the light-emitting panel directly to a predetermined left-eye location;
   wherein a center of the first portion of the light-emitting panel is not aligned with a center of the right-eye reflective surface and neither the center of the first portion of the light-emitting panel nor the center of the right-eye reflective surface are aligned with the predetermined right-eye location, and the first plurality of different surface elements of the right-eye reflective surface is configured to correct for image skew of an image depicted by the first portion of the light-emitting panel and reflected toward the predetermined right-eye location; and
   wherein the second plurality of different surface elements of the left-eye reflective surface is configured to correct for image skew of an image depicted by the second portion of the light-emitting panel and reflected toward the predetermined left-eye location;
   wherein a first distance between a center point of the first portion of the light-emitting panel and a center point of the second portion of the light-emitting panel is different from a second distance between the predetermined right-eye location and the predetermined left-eye location.

2. The optical system of claim 1, wherein the display device holder is configured to maintain the light-emitting panel in a predetermined position and orientation with respect to the lens element to reflect light emitted from the light-emitting panel from the right-eye reflective surface toward the predetermined right-eye location and the left-eye reflective surface toward the predetermined left-eye location.

3. The optical system of claim 1, wherein the optical system further comprises a support coupled to the lens element holder and the display device holder, the support configured to be mounted on a helmet.

4. The optical system of claim 3, further comprising the helmet, wherein the support is mounted on the helmet.

5. The optical system of claim 1, wherein the lens element comprises a single lens element.

6. The optical system of claim 1, wherein the right-eye reflective surface and the left-eye reflective surface are each non-symmetrical concave surfaces and join at a center region of the lens element.

7. The optical system of claim 1, wherein the lens element comprises a first lens element and a second lens element that is separate from the first lens element, the first lens element comprising the right-eye reflective surface and the second lens element comprising the left-eye reflective surface.

8. The optical system of claim 1, wherein the second distance is greater than the first distance.

9. The optical system of claim 1, wherein the first plurality of different surface elements oriented to reflect and collimate light from corresponding different regions of the first portion of the light-emitting panel is further oriented to reflect light received from the second portion of the light-emitting panel in a direction other than toward the right eye of the user.

10. The optical system of claim 1, wherein the display device holder is configured to receive a portable display device.

11. The optical system of claim 1, wherein the display device holder is configured to maintain the light-emitting panel above and in front of the eyes of the user.

12. The optical system of claim 1, wherein the optical system further comprises a support coupled to the lens element holder and the display device holder, and further comprising a lens element adjustment mechanism that is configured to, in response to user manipulation, alter a distance of the lens element from the light-emitting panel and the eyes of the user.

13. The optical system of claim 1, wherein the lens element is a partially transparent and partially reflective lens element.

14. The optical system of claim 1, wherein the lens element comprises a beam splitter.

15. The optical system of claim 1, wherein the lens element comprises a right-eye exterior surface and a left-eye exterior surface, and further comprising an anti-reflective coating disposed on the right-eye exterior surface and the left-eye exterior surface.

16. An optical system consisting of:
 a lens element;
 a lens element holder configured to position the lens element with respect to eyes of a user;
 a display device holder configured to hold a display device having a single light-emitting panel;
 a support coupled to the lens element holder and the display device holder, and further comprising a lens element adjustment mechanism that is configured to, in response to user manipulation, alter a distance of the lens element from the light-emitting panel and the eyes of the user; and
 wherein the lens element comprises a right-eye reflective surface and a left-eye reflective surface, the right-eye reflective surface comprising a first plurality of different surface elements oriented to reflect and collimate light from corresponding different regions of a first portion of the light-emitting panel directly to a predetermined right-eye location and the left-eye reflective surface comprising a second plurality of different surface elements oriented to reflect and collimate light from corresponding different regions of a second portion of the light-emitting panel directly to a predetermined left-eye location.

* * * * *